Jan. 26, 1965 R. KREMP 3,167,180
TRANSPARENCY HOLDER
Filed March 22, 1960 3 Sheets-Sheet 1

INVENTOR.
RUDOLF KREMP
BY
Michael S. Striker
Attorney

Jan. 26, 1965     R. KREMP     3,167,180
TRANSPARENCY HOLDER
Filed March 22, 1960     3 Sheets-Sheet 2
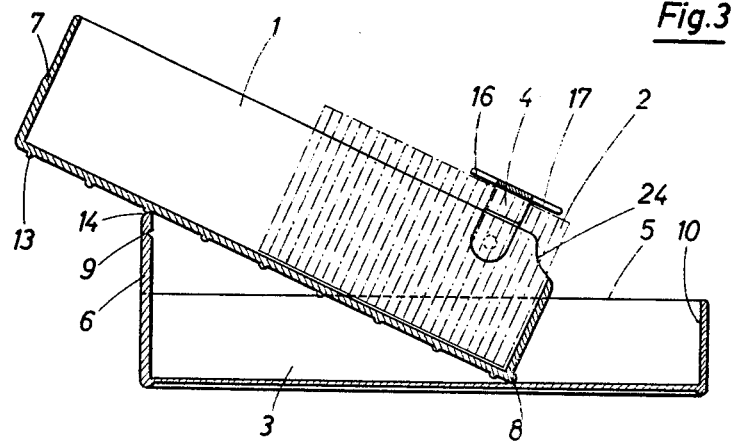
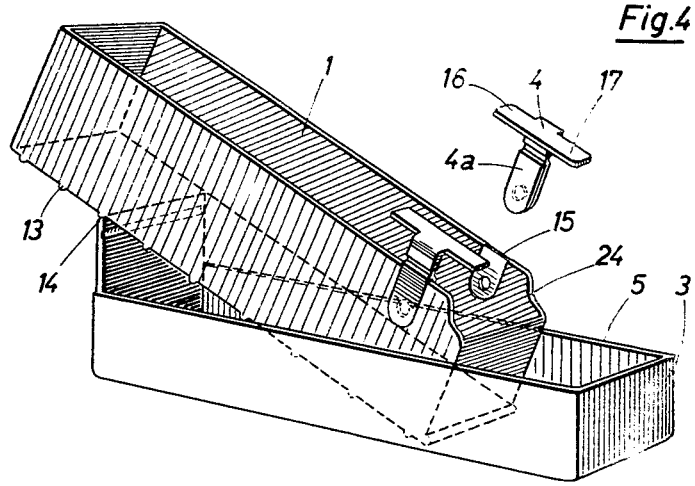
INVENTOR.
RUDOLF KREMP
BY

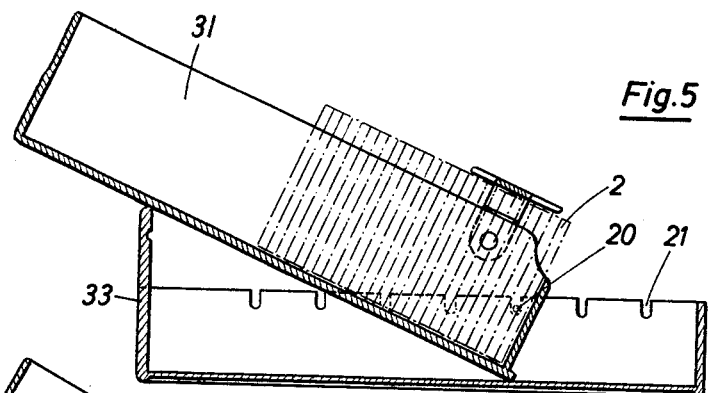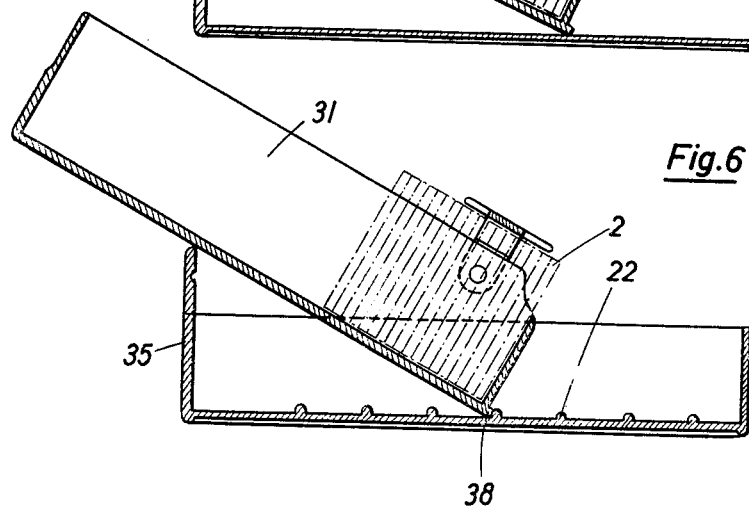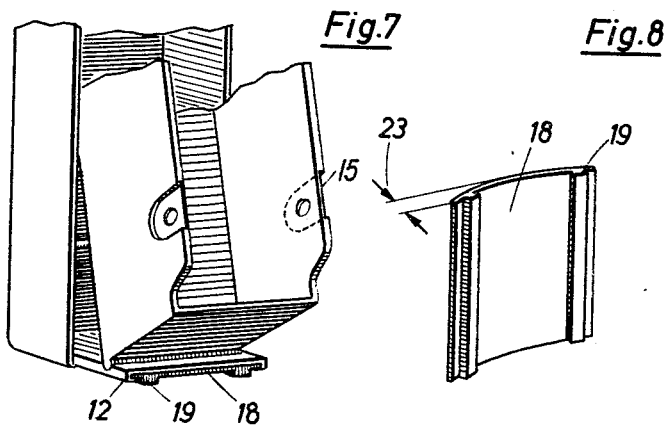

United States Patent Office 3,167,180
Patented Jan. 26, 1965

3,167,180
TRANSPARENCY HOLDER
Rudolf Kremp, Munich, Germany, assignor to Agfa Aktiengesellschaft, Leverkusen-Bayerwerk, Germany
Filed Mar. 22, 1960, Ser. No. 16,774
Claims priority, application Germany Mar. 25, 1959
6 Claims. (Cl. 206—45.20)

The present invention relates to enclosures.

More particularly, the present invention relates to holders which are adapted to enclose articles such as a row of transparencies.

One of the objects of the present invention is to provide a transparency holder which will be dust-tight when the holder is closed and which at the same time can be opened and have its parts positioned with respect to each other in such a way that the transparencies are accessible in an extremely convenient manner.

Another object of the present invention is to provide a transparency holder which can have its parts positioned with respect to each other in such a way that the several transparencies will automatically move up to a position where they are easily accessible.

A further object of the present invention is to provide a transparency holder with a means which will prevent all except one of the transparencies from being removed at one time.

An additional object of the present invention is to provide a transparency holder with an identification plate which will reliably remain in engagement with the transparency holder and which can also participate in providing a stable support for the transparency holder when it is in a position suited for removal of the transparencies therefrom.

The object of the present invention also includes the provision of an exceedingly simple rugged structure which will operate reliably to produce the above objects.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a sectional side elevation illustrating another possible position of the transparency holder of FIG. 1;

FIG. 4 is a perspective view of the structure of FIG. 3 showing in a partly exploded illustration another embodiment of a retainer;

FIG. 5 is a side sectional view illustrating another embodiment of a transparency holder according to the invention;

FIG. 6 is a side sectional view illustrating yet another embodiment of a transparency holder according to the invention;

FIG. 7 is a fragmentary perspective illustration showing the manner in which an identification plate is joined with the transparency holder of the invention; and FIG. 8 is a perspective illustration of the identification plate of FIG. 7 when this identification plate is removed from the transparency holder.

Figure 1:
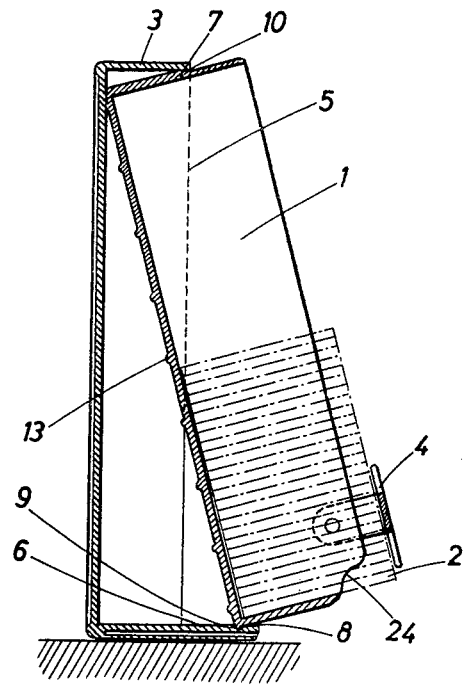
FIG. 1 is a sectional side elevational view illustrating a transparency holder according to the invention in one possible position when it is set up for use.

Referring now to the drawings, and in particular to FIGS. 1–6, it will be seen that the transparency holder of the invention includes an inner container member 1 adapted to hold a row of transparencies 2. The inner container 1 is adapted to be closed by an outer cover member 3. Also, the inner container member 1 carries a retainer 4 and, as shown in FIG. 7, an identification plate 18.

As is apparent from the drawings, the inner container member has a bottom wall, a pair of side walls extending therefrom, and a pair of end walls connected to the side walls and also extending from the bottom wall. Also, the outer cover member 3 has a top wall, a pair of side walls extending therefrom, and a pair of end walls connected to the side walls and extending from the top wall of the outer cover member 3. When this outer cover member is in its position closing the inner container member, the open top of the inner container member is inaccessible since it is covered by the top wall of the cover 3, and the side and end walls of the outer cover member 3 overlap and engage the side and end walls of the inner container member 1, respectively, at the exterior thereof, so that in this way the transparency holder provides a dust-tight enclosure for the transparencies 2.

The outer cover member 3 has one of its end walls 6 extending beyond the free edges 5 of its side walls. This end wall 6 provides a stable support when the holder is set up into position as shown in FIG. 1, and in addition this end wall 6 participates in the support of the inner container member 1 when it is in the position shown in FIG. 3, for example.

A means is carried by and cooperates with the inner container member 1 and the outer cover member 3 for supporting the inner container member 1 in a position inclined with respect to the outer cover member 3 with the bottom wall of the inner container member 1 extending at least partly into the outer cover member 3, as illustrated in FIGS. 1 and 3, for example. This support means includes a projection carried by one of the members and a stop portion carried by the other of the members for preventing movement of the projection in at least one direction so as to retain the inner container member 1 in its inclined position relative to the outer cover member 3. Thus, referring to FIG. 1, it will be seen that the support means of this embodiment includes a projection in the form of an elongated rib 8 forming part of the inner container member 1 and located at the bottom end of one of its end walls. The stop portion of the support means is formed by an elongated groove 9 at the inner surface of the end wall 6 receiving the projection 8, when the parts are in the position of FIG. 1. It will be noted that in this position the bottom wall of the inner container member 1 extends between the end walls of the outer cover member 3, and to provide added security of the parts in this position the end wall of the inner container member 1 which is opposed to the end wall thereof which carries the projection 8 is formed with an inclined shoulder 7, also shown in FIG. 3, and this shoulder 7 engages the free edge portion of the adjoining end wall of the outer cover member 3 so that the parts are reliably maintained in the position illustrated in FIG. 1. The outer cover member 3 is made of a resilient material e.g. polystyrol at least at the portion of its end wall 6 which extends beyond the free edges 5 of its side walls, although it is preferred to make the outer cover member 3 in one piece of a resilient springy material as polystyrol and also it is preferred to make the inner container member 1 out of one piece of a resilient springy material e.g. polycarbonate. Because of the springiness of the end wall 6 particularly at the portion thereof which extends beyond the side walls of the outer cover member 3, the projection 8 will snap into and be resiliently retained within the groove 9, so that the parts will be reliably maintained in the position shown in FIG. 1.

This end wall 6 of the outer cover member 3 is formed with a pair of guides 11 and 12 shown most clearly in FIG. 2, and these guides form grooves with the exterior surface of the end wall 6 adapted to receive the side edges of an identification plate 18 (FIGS. 7 and 8) described in greater detail below.

In order to be able to maintain the parts in the position shown in FIG. 3 where the inner container member 1 is supported in an inclined position which is not so pronounced as the position shown in FIG. 1 the support means takes the form of a plurality of projections 13 located at the exterior surface of the bottom wall of the inner container member 1, and the free edge 14 of the end wall 6 of the outer cover member 3 forms a stop portion cooperating with a selected one of the projections 13 to form therewith a support means capable of supporting the inner container member 1 at a selected inclination, the free edge 14 being curved so as to come to a sharp edge, as is shown most clearly in FIG. 3, so as to cooperate properly with the projections 13. Although these projections 13 may take the form of relatively small bosses, for example, it is preferred that they be in the form of elongated ribs distributed along the bottom wall of the inner container member 1 and extending across this bottom wall so as to cooperate with the free edge 14 substantially along the entire length thereof, and thus provide a very secure support for the inner container member 1 at a selected angle of inclination.

As is apparent from FIGS. 1 and 3, the transparencies 2 are removed one after the other from their position next to the lowermost end wall of the inclined inner container member 1. In order to facilitate removal of the transparencies in succession the lowermost end wall of the inner container member 1 extends from its bottom wall by a distance less than the side walls thereof, and these side walls have removed corner portions so as to provide the cutouts 24 which make it very easy for the operator to grasp the end transparency 2 and remove the same from the inner container member 1 through its open top.

A retainer 4 is connected to the inner container member 1 adjacent to its lowermost end wall, and this retainer 4 overlies all of the transparencies in the region of the lower end wall of the inner container member 1, except for the end transparency directly next to this end wall, so that the retainer 4 will prevent removal of all except the end transparency 2. However, due to the inclination of the inner container member 1, when this end transparency 2 is removed the remaining transparencies will simply slide automatically by gravity toward the lowermost end wall of the inner container member 1, so that the next transparency is immediately in a position for removal from the inner container member 1, while the retainer 4 operates to prevent removal of the adjoining transparencies.

Figure 2:
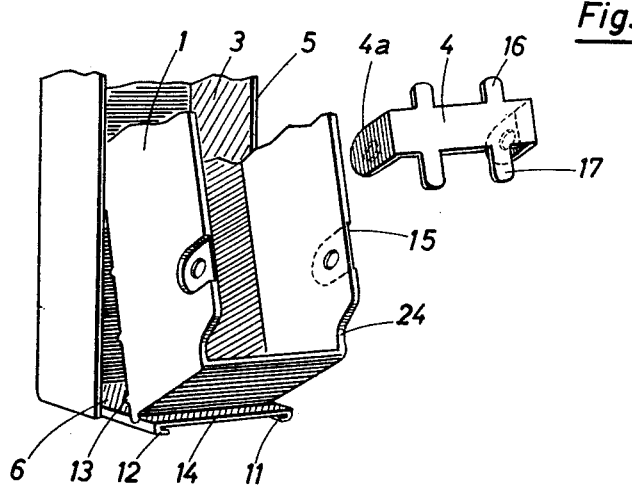
FIG. 2 is a fragmentary, partly exploded view of the structure of FIG. 1 showing in particular the details of a transparency retainer and its connection with the transparency holder.

As is shown most clearly in FIG. 2, the side walls of the inner container member 1 are formed at their exteriors in the region of the lowermost end wall thereof with a pair of recesses 15 extending up to the free edges of the side walls, respectively, and thus the side walls have at the recesses 15 portions which are thinner than the remainder of the side walls, and these thinner portions are formed, respectively, with openings as shown most clearly in FIG. 2. The retainer member 4 is made of any springy sheet metal and has an upper portion which extends across the open top of the container member 1 to overlie the group of transparencies beneath this upper portion of the retainer 4. The upper portion of the retainer 4 is integrally connected with a pair of downwardly directed end portions 4a which are respectively received in the recesses 15 and whose thickness is substantially equal to the depth of these recesses so that the exterior surfaces of the end portions 4a of the retainer 4 are flush with the exterior surfaces of the opposed side walls of the inner container member 1. Thus, with this arrangement the retainer 4 can remain connected to the inner container member 1 without in any way interfering with the placing of the outer cover member 3 on the inner container member 1 or with the removal of the outer cover member 3 from the inner container member 1, and also the end portions 4a will in no way interfere with the dust-tight closure of the transparency holder. The retainer 4 is made of a springy metal and the end portions 4a thereof respectively carry the projections which are received in the openings of the thinner side wall portions of the container member 1 at the recesses 15 thereof. In this way the projections at the end portions 4a will snap into these openings so as to provide a releasable connection between the retainer 4 and the inner container member 1. It is of course possible to provide a fixed, more or less permanent connection between the retainer 4 and the container 1, but a removable connection is preferred. The retainer 4, instead of being made in one piece, as indicated in FIG. 2, can also be made in two parts, as indicated in FIG. 4. In this case each of the side walls of the inner container member 1 is formed in both of its faces with the recesses 15 and the end portion 4a of each of the parts of the retainer 4 is bifurcated so as to receive between its bifurcations the thinnest part of the side walls of the inner container member 1, and in this case also the end portions 4a of the two parts of the retainer 4 are flush with the exterior and interior surfaces of the side walls of the inner container member 1, the bifurcations of each member of the retainer carrying pins which snap into the opening formed in the thinnest part of each side wall of the container member 1 at the recesses 15 thereof. If desired, only one of the bifurcations of each part of the retainer 4 can have a projection to pass into this opening to provide a releasable connection of the retainer with the inner container member 1.

The upper portion of the retainer 4 of the embodiment of FIG. 2 as well as of the embodiment of FIG. 4 extends towards the lowermost end wall of the inner container member 1 and overlies the transparencies in the region of this lower end wall except for the one transparency which is directly next to the lowermost end wall of the inner container member 1. Thus, when the operator removes this end transparency if his fingers should simultaneously engage the next transparency the retainer will prevent removal of this next transparency so that the retainer by extending up to the end transparency but not overlapping this end transparency guarantees the removal only of the one transparency which is next to the lowermost end wall of the inner container member 1.

As is apparent from FIGS. 2 and 4, the retainer 4 is provided at its upper portion with fingers 17 directed toward the lowermost end wall of the inner container member 1 and with fingers 16 directed in the opposite direction, and it will be noted that the fingers 16 are shorter than the fingers 17. In this way the retainer can be placed either in the position indicated in FIGS. 2 and 4 where the fingers 17 extend downwardly toward the lowermost end wall of the inner container member 1, or the retainer 4 can be reversed so that its fingers 16 extend downwardly toward the lowermost end wall of the inner container member 1. The transparencies will have different thicknesses depending upon the particular framing in which the transparencies are mounted. Thus, the frame of each transparency may be made of glass, plastic, or cardboard, and by providing the fingers 16 and 17 of different lengths is possible to position the retainer so that the retainer is adapted to the particular thickness provided by the framing of the transparencies so that the fingers 16 or 17 will terminate in a position where they overlie the next to the last transparency so that only the last transparency next to the lowermost end wall of the inner container member 1 will be removed. Of course, as soon as this end transparency is removed the rest of the transparencies slide down by gravity, so that the next transparency is immediately available for removal.

Because the retainer 4 in the embodiment of FIG. 2 or in the embodiment of FIG. 4 is made of a thin sheet material and has its upper portion located directly next to the tops of the transparencies, the retainer 4 can remain in position connected to the inner container member 1 when the latter is covered by the outer cover member 3.

FIGS. 5 and 6 show other variants which are included within the scope of the invention. Thus, referring to FIG. 5 it will be seen that the support means which is carried by the inner container member 31 and outer cover member 33 and cooperates with these members for supporting the inner container member in the inclined position shown in FIG. 5 with respect to the outer cover member takes the form of projections 20 which are respectively fixed to the side walls of the inner container member 31 and extend from the side walls, these projections 20 being in the form of pins, for example, fixed to these side walls of the inner container member 31 adjacent to the lowermost end wall thereof. The side walls of the outer cover member 33 are formed with a series of notches 21 extending inwardly from their side edges, and these notches are so positioned that they will receive the pins 20 which can be selectively placed in a selected pair of notches 21, respectively, for supporting the inner container member 31 at a desired inclination such as that illustrated in FIG. 5.

Also, as is indicated in FIG. 6, the projections 22, which are similar to the projections 13, instead of being carried by the inner container member 31, can be provided on the inner surface of the top wall of the outer cover member 35, and in this case these projections 22 serve as stop portions and cooperate with the projection 38 in order to position the inner container member 31 at the desired angle of inclination, such as, for example, that indicated in FIG. 6. It will be noted from FIGS. 5 and 6 that the extended end wall of the outer cover member serves to support the bottom wall of the inner container between its ends in the inclined position where the projection 38 of FIG. 6 cooperates with a selected stop portion 22 to prevent forward sliding of the inner container member, or in the case of FIG. 5 where the pins 20 cooperate with a selected pair of notches 21 for the same purpose. Otherwise the embodiments of FIGS. 5 and 6 are identical with those described above.

FIGS. 7 and 8 illustrate the identification plate 18 and its cooperation with the end wall 6 of the outer cover member 3. As was pointed out above, and as is shown in FIG. 2, this end wall 6 is provided at its exterior with a pair of elongated guides 11 and 12, and these guides form elongated grooves with the end wall 6 at the exterior thereof. The identification plate 18 which can bear any kind of indicia for identifying the transparencies within the transparency holder of the invention, is made of a resilient material preferably polyvinilchlorid, whose exterior surface has a high coefficient of friction. As is indicated in FIG. 8, when the identification plate 18 is removed from the transparency holder of the invention and is unstressed it has a curvature so that its front face is concave and its rear face convex, this curvature being indicated at 23. Thus, when the plate 18 is placed with its side edges in the guides 11 and 12 so as to be slidable along the latter and retained by these guides 11 and 12 in position next to the end wall 6, the inherent resiliency of the identification plate will cause its side edges to press against the guides 11 and 12 and thus serve together with the high coefficient of friction of the plate 18 to retain the latter reliably within the guides 11 and 12. As is apparent from FIG. 7, the plate 18 is flattened in opposition to its inherent resiliency by the end wall 6 and the guides 11 and 12.

This plate 18 has a pair of elongated ribs 19 which are parallel to each other and parallel to the guides 11 and 12, and these ribs 19 are located between and respectively next to the guides 11 and 12 and the thickness of the ribs 19 is sufficient to locate the front faces thereof forwardly beyond the guides 11 and 12, as is apparent from FIG. 7. Thus, when the structure is set up in the position shown in FIG. 1 so that it rests on the end wall 6, the front exterior faces of the ribs 19 will be the surfaces which will engage the supporting surface which carries the entire transparency holder when it is in the position of FIG. 1, and these front faces of the ribs 19 due to their high coefficient of friction will provide a stable support for the transparency holder of the invention. The entire exterior surface of the identification plate 18 may be roughened so as to guarantee that it has the desired high coefficient of friction.

It will be understood that each of the elements described above, or two or more together, may also find a useful application in other types of transparency holders differing from the types described above.

While the invention has been illustrated and described as embodied in adjustable transparency holders, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A transparency holder comprising, in combination, an inner container member having an open top, an elongated bottom wall, a pair of opposed elongated side walls extending from said bottom wall, and a pair of opposed end walls connected to said side walls and also extending from said bottom wall, said inner container member being adapted to hold a row of transparencies which are removable from said inner container member through said open top thereof; an outer cover member having a pair of opposed elongated side walls and a pair of opposed end walls connected to said side walls, said outer cover member also having an elongated top wall connected to said side and end walls thereof and said outer cover member having a covering position closing said open top of said inner container member with said side and end walls of said outer cover member located outside of and overlapping said side and end walls of said inner container member, respectively; and support means carried by and cooperating with said inner container member and outer cover member for supporting said inner container member in a position inclined with respect to said outer cover member with said bottom wall of said inner container member extending at least in part into said outer cover member, said support means including a projection fixed to one of said members and a plurality of stop portions carried by and distributed along an elongated wall of the other of said members, one of said stop portions being selectively engaged by said projection to prevent sliding of the latter in at least one direction beyond said selected stop portion so that said projection and selected stop portion cooperate to maintain said inner container member at a selected inclined position relative to said outer cover member, said projection being formed by at least one pin fixed to and extending laterally from a side wall of said inner container member and said stop portions being formed by a part of a side wall of said outer cover member which is formed with a plurality of cutouts which selectively receive said pin.

2. A transparency holder comprising, in combination an inner container member having an open top, a bottom wall, a pair of opposed side walls extending from said bottom wall, and a pair of opposed end walls connected to said side walls and also extending from said bottom wall, said inner container member being adapted to hold a row of transparencies which are removable from said inner container member through said open top thereof; an outer cover member having a pair of opposed side walls and a pair of opposed end walls connected to said side walls, said outer cover member also having a top wall connected to said side and end walls thereof and said outer cover member having a covering position closing said open top of said inner container member with said side and end walls of said outer cover member located outside of and overlapping said side and end walls of said inner container member, respectively; means carried by and cooperating with said inner container member and outer cover member for holding said inner container member in a position inclined with respect to said outer cover member with said bottom wall of said inner container member extending at least partly into said outer cover member, at least one of said side walls of said inner container member being formed in the region of one of the end walls thereof with an exterior recess extending up to a free edge of said one side wall of said inner container member; and a transparency retainer having an upper portion extending at least part way across the open top of said inner container member and a side portion connected to said inner container member in said recess of said side wall thereof flush with the exterior surface of said one side wall of said inner container member, said upper portion of said retainer extending toward said one end of said inner container member up to a point where said upper portion of said retainer overlies all except the end transparency which is located directly next to said one end wall of said inner container member so that the operator can remove said end transparency while said retainer will prevent removal of the adjoining transparencies.

3. A transparency holder comprising, in combination, an inner container member having an open top, a bottom wall, a pair of opposed side walls extending from said bottom wall, and a pair of opposed end walls connected to said side walls and also extending from said bottom wall, said inner container member being adapted to hold a row of transparencies which are removable from said inner container member through said open top thereof; an outer cover member having a pair of opposed side walls and a pair of opposed end walls connected to said side walls, said outer cover member also having a top wall connected to said side and end walls thereof and said outer cover member having a covering position closing said open top of said inner container member with said side and end walls of said outer cover member located outside of and overlapping said side and end walls of said inner container member, respectively; means carried by and cooperating with said inner container member and outer cover member for holding said inner container member in a position inclined with respect to said outer cover member with said bottom wall of said inner container member extending at least partly into said outer cover member, one of the end walls of said outer cover member carrying at its exterior a pair of elongated guides; and an identification plate located next to said one end wall of said outer cover member at the exterior thereof and having a pair of opposed side edges slidable in said guides.

4. In a transparency holder as recited in claim 3, said identification plate being made of a springy material and having in its unstressed condition when it is removed from said end wall a curvature which causes due to the inherent resiliency of said plate said side edges of said plate to press against said guides.

5. In a transparency holder as recited in claim 3, said plate having a pair of exterior ribs extending beyond said guides and terminating in outer surfaces, respectively, which engage a support surface on which said cover member rests when it is set up on its end wall.

6. In a transparency holder as recited in claim 3, said identification plate having a high coefficient of friction with respect to said end wall.

References Cited in the file of this patent
UNITED STATES PATENTS

| | | |
|---|---|---|
| 193,366 | Dreyfus | July 24, 1877 |
| 1,319,973 | Simpson | Oct. 28, 1919 |
| 2,113,245 | Thomas | Apr. 5, 1938 |
| 2,542,724 | Stettner | Feb. 20, 1951 |
| 2,868,367 | Shiffman | Jan. 13, 1959 |
| 3,880,857 | Parsons et al. | Apr. 7, 1959 |